May 23, 1939.  A. J. HIXON  2,159,154
CABLE TAPPING DEVICE
Filed April 22, 1937   2 Sheets-Sheet 1
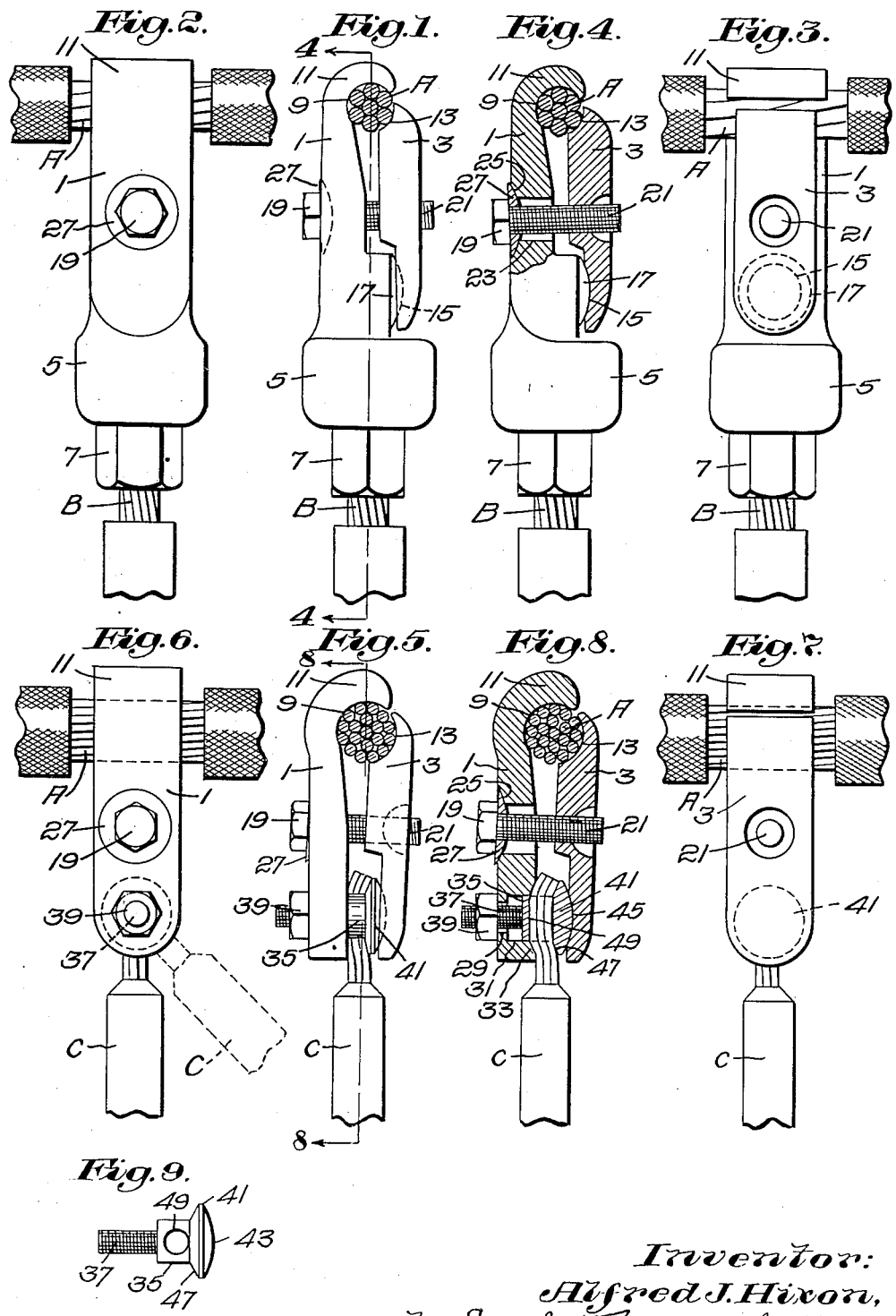
Inventor:
Alfred J. Hixon,
by Emery, Booth, Townsend, Miller & Weidner
Attys May 23, 1939.　　　　A. J. HIXON　　　　2,159,154
CABLE TAPPING DEVICE
Filed April 22, 1937　　　　2 Sheets-Sheet 2
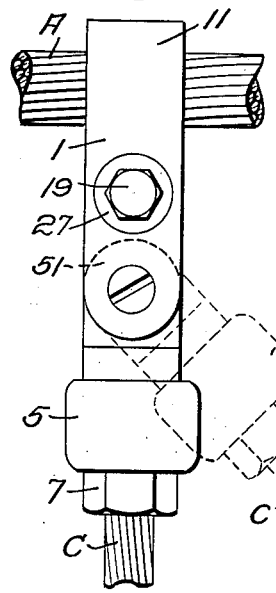
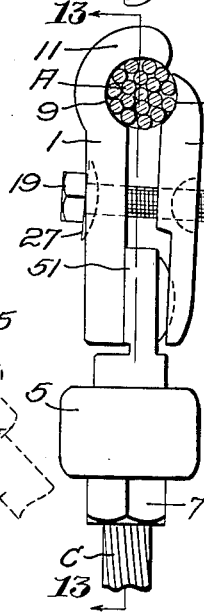
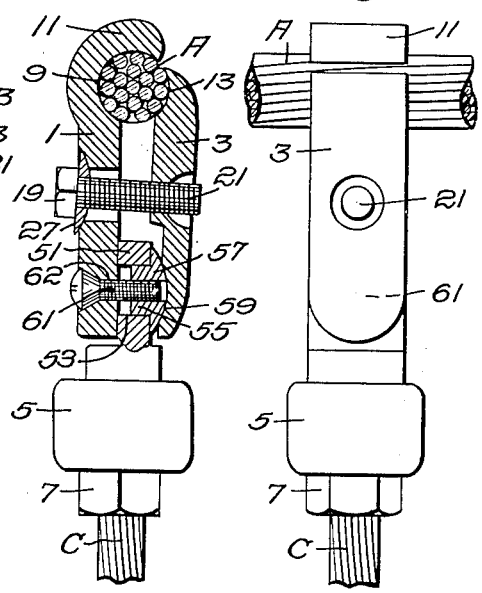
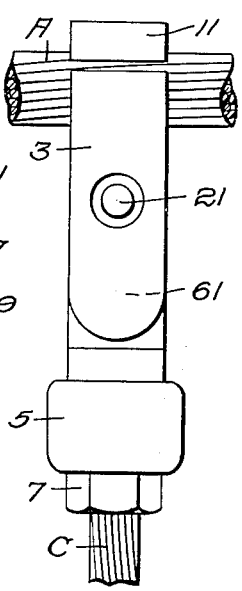
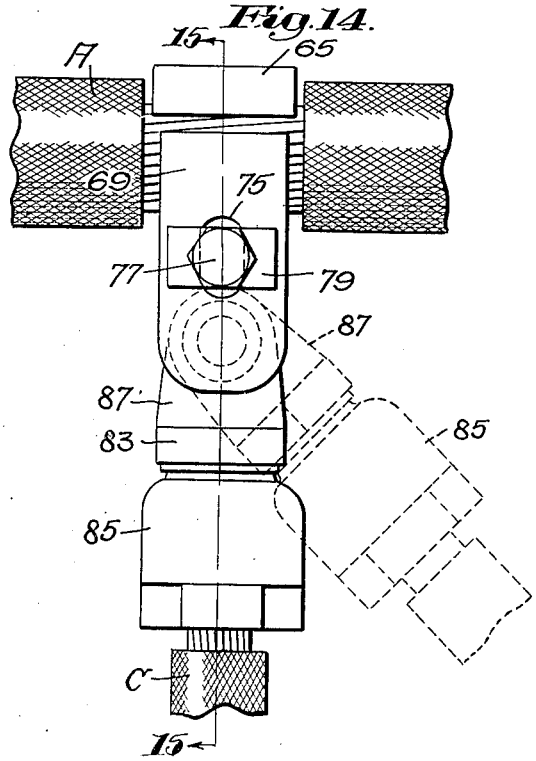
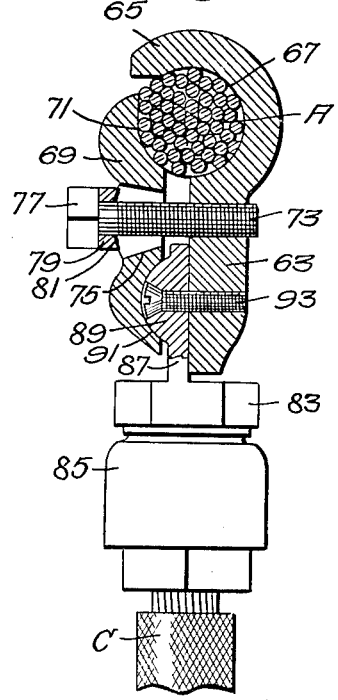
Inventor:
Alfred J. Hixon,
by Emery, Booth, Townsend, Miller & Weidner
Attys Patented May 23, 1939

2,159,154

UNITED STATES PATENT OFFICE 2,159,154

CABLE TAPPING DEVICE

Alfred J. Hixon, Braintree, Mass.

Application April 22, 1937, Serial No. 138,394

16 Claims. (Cl. 173—273)

This application is a continuation-in-part of applicant's co-pending application Serial No. 734,-970, filed July 13, 1934.

The invention, which has among its objects the provision of an improved form of device for tapping cables and other conductors, will be best understood from the following description when read in the light of the accompanying drawings of several embodiments of the invention selected for illustrative purposes, the scope of the invention being more particularly pointed out in the appended claims.

In the drawings:

Fig. 1 is a side elevation, Fig. 2 a front elevation, Fig. 3 a rear elevation, and Fig. 4 a section on the line 4—4 of Fig. 1, of one form of cable tapping device constructed according to the invention;

Fig. 5 is a side elevation, Fig. 6 a front elevation, Fig. 7 a rear elevation, Fig. 8 a section on the line 8—8 of Fig. 5, and Fig. 9 a detail, of a second form of cable tapping device constructed according to the invention;

Fig. 10 is a side elevation, Fig. 11 a front elevation, Fig. 12 a rear elevation, and Fig. 13 a section on the line 13—13 of Fig. 10, of a third form of cable tapping device constructed according to the invention; and Fig. 14 is a front elevation, and Fig. 15 a section on the line 15—15 of Fig. 14, of a fourth form of cable tapping device constructed according to the invention.

Referring particularly to Figs. 1 to 4 of the drawings, the cable tapping device illustrated comprises a jaw member 1 and a cooperating jaw member 3 between which the cable or other conductor A is adapted to be clamped, it being understood that these jaw members commonly will be formed of brass, bronze, or other material of good electrical conductivity. In this modification of the invention the jaw member 1 carries a cable lug to which is secured the end of the tap cable or other conductor B. This cable lug may be a so-called solder lug, but in the present embodiment of the invention is a mechanical lug such as is disclosed in applicant's co-pending application Serial No. 70,774, filed March 25, 1936, the part 5 being a casing for the mechanical lug formed integrally with the jaw member 1, and the nut 7 constituting the means for operating the mechanism of the lug contained within that casing. In case a solder lug is provided the part 5 may be of suitable dimensions to constitute the sleeve into which the end of the cable is inserted and soldered.

As shown, the jaw member 1 is provided with a recess 9 which receives the cable A, the end of the member being formed to provide an upstanding part 11 against which the side of the cable rests. The jaw member 3 is provided with a shallow recess 13 adapted to engage the side of the cable opposite the upstanding part 11. At its opposite end the jaw member 3 is provided with a recess 15 which receives the boss-like projection 17 formed integrally with the jaw member 1. The contacting surfaces of the recess 15 and projection 17 preferably are part of a spherical surface, and for convenience, are hereinafter referred to as of "spherical" shape.

As shown, a screw having a head 19 and a shank 21 is provided for drawing the jaw members together to clamp the cable A between them. The shank 21 is screw-threaded into the jaw member 3 and loosely extends through a perforation 23 in the jaw member 1. At its outer end the perforation 23 is recessed at 25, which recess receives a washer 27 through which the shank 21 of the screw extends and against which the head 19 of the screw bears. The contacting surfaces of the recess 25 and washer 27, as shown, are part of a spherical surface, so that the washer may rock in any direction relative to the jaw member 1.

By reason of the above construction, when the above described screw connection between the jaw members 1 and 3 is tightened to clamp the cable A between them, the cable gripping recess portion 13 of the member 3 moves toward the cable longitudinally of the member 1. This facilitates proper gripping of cables of widely varying diameters, and secures good electrical contact by forcing the cable toward the upstanding part 11 of the member 1 and into the recess 9. Also, this upstanding part enables the member 1 readily to be hooked over a horizontal cable to facilitate assembly of the fitting therewith. The "spherical" shape of the outer surface of the boss-like projection 17 further permits transverse swiveling or rocking of the jaw members 1 and 3 relative to each other so that they will firmly seat on a cable which is bent or is otherwise irregular. By reason of the spherical shape of the contacting surfaces of the recess 25 and washer 27, this longitudinal motion and transverse rocking of the member 3 relative to the member 1 is not interfered with by the screw which draws said members together.

The form of the invention illustrated by Figs. 5 to 9 inclusive is similar to that just described, except for the means for attaching the tap cable or other conductor C, this form being particularly suitable when the conductor C is of smaller sizes.

In this latter modification of the invention, the member 1 at its end opposite the cable A is provided with a cylindrical perforation 29 which at its inner end is formed with a cylindrical enlargement 31, the inner end of the enlargement communicating with a shallow recess having the frusto-conical walls 33. Reciprocally mounted in the enlargement 31 is the cylindrical part 35 of a stud-like member or tap-connector-fitting having a screw-threaded shank 37, which shank extends through the perforation 29 and projects beyond the outer side of the jaw member 1, the projecting portion of the shank being provided with a nut 39. At its end opposite the shank the stud-like member is provided with a head 41, the outer surface 43 of which is of "spherical" shape and slidably fits into a correspondingly shaped recess 45 in the jaw member 3. At its opposite side the head 41 is formed with a frusto-conical surface 47 complementary to the frusto-conical surface 33 on the jaw member 1.

The part 35 of the stud-like member is shown as provided with a through perforation 49 through which the end of the conductor C may be inserted. When the stud-like member is forced inwardly relative to the jaw member 1 the conductor C will be effectively secured to the latter, the cooperating frusto-conical surfaces 47 and 43 acting to bend and splay the extreme end of the conductor so that it cannot readily be pulled out of the perforation 49.

The stud-like member may be drawn inwardly relative to the member 1 by means of either the nut 39 or the screw which draws the two jaw members toward each other, it being observed that when the screw is tightened the stud-like member is forced inwardly relative to the member 1. Conveniently, however, the tap conductor C is secured to the member 1 by means of the nut 39 before the jaw members are clamped to the cable A, as this commonly facilitates the handling of the device. The nut 39 however may be omitted, or may be employed merely for securing to the jaw member 1 the stud-like member to prevent loss of the former in handling the device during storage and shipment. It will be observed that during the operation of clamping the jaw members to the cable A, when the stud-like member will be pressed inwardly, the nut 39 may become loosened. However, loosening of the nut 39 will in no way cause release of the conductor C. It will further be observed that with this construction, because the stud-like member is rotatably carried by the jaw members, the conductor C may be swiveled relative to those members, as, for example, to the dotted line position of the conductor C shown in Fig. 6. Otherwise the operation of this form of the invention is as above described in connection with the form of the invention illustrated by Figs. 1 to 4.

In the form of the invention disclosed by Figs. 10 to 13, the construction is the same as that described in connection with Figs. 1 to 4, except that the mechanical lug exemplified by the above referred to casing 5 and nut 7 is not permanently attached to either of the jaw members, but is detachable to permit different lugs to be substituted for widely different sizes of tap cable C. As illustrated, the casing 5 of the mechanical lug has formed integrally therewith the flattened projection 51 provided with a perforation 53. In this perforation is rotatably received the cylindrical projection 55 of a fulcrum forming part having a head 57, the outer surface of which head is "spherical" and is received in the spherical recess 59 formed in the jaw member 3. Interchangeable fulcrum forming parts having projections 55 of requisite diameters are employed to fit any particular diameter of the perforation 53 of the cable lug to be attached. The fulcrum forming part, as shown, conveniently is provided with a screw-threaded perforation which receives the screw-threaded shank 61 of a screw for attaching the cable lug to the jaw member 1, the shank loosely extending through the perforation 62 in the jaw member.

It will be observed in the construction just described that when the screw having the shank 21 is rotated to draw the jaw members together to clamp them to the cable A, the head 57 will be forced toward the jaw member 1 securely to clamp the cable lug to that member due to the fact that the shank 61 of the screw which secures the cable lug to the jaw member 1 is reciprocal relative to that member. Also, by reason of the construction described, the fulcrum forming part which fits both the perforation in the cable lug and the recess 59 in the jaw member 3 is effective to secure the cable lug to the jaw members, even though the screw having the shank 61 should become loosened. It will further be observed that this construction permits swiveling of the conductor C relative to the jaw members, as, for example, to the dotted line position of the conductor shown in Fig. 11. Otherwise the operation of the device is like that of the modification of the invention shown by Figs. 1 to 4.

Referring to Figs. 14 and 15, which show a form of the invention particularly adapted for tapping cables of larger sizes, one of the jaw members 63, as heretofore described, is provided at its end with an upstanding part 65, and with a curvilinear recess 67 which receives the cable A, the other jaw member 69 being provided with a cooperating curvilinear recess 71 which engages the cable surface at one side of the upstanding part 65. In this modification a bolt 73 is provided for drawing the jaw members 63 and 69 toward each other for gripping the cable A between them. As shown, the bolt is tapped into the jaw member 63 and extends through an elongated slot 75 in the member 69, the head 77 of the bolt resting upon a member 79 which bridges the slot 75 and rests upon the upper raised surface 81 of the member 69. Herein the surface 81 is curved longitudinally of the member 69 and the under contacting surface of the member 79 is similarly shaped. This construction prevents turning of the member 79 when the bolt is tightened, and permits rocking movement of the jaw member 69 on its fulcrum, and, as hereinbefore has been explained, movement of the jaw member 69 longitudinally of the jaw member 63.

As shown, secured to the jaw member 63 is a tap connector fitting 83 for the tap cable or other conductor C. As illustrated, the fitting comprises a mechanical connector or lug 85 for gripping the end of the cable C, an example of such fitting being shown in applicant's co-pending application Serial No. 725,934, filed May 16, 1934 issued as Patent No. 2,093,079 on September 14, 1937. However, if desired, as explained in connection with the modification shown by Figs. 1 to 4, any suitable form of solder lug may be employed in place of the mechanical lug. Herein the fitting at one end has a flattened portion or projection 87 on one side of which is formed a "spherical" surfaced boss-like projection 89 of the character hereinbefore described in connection with the modification shown by Figs. 1 to 4, while the jaw member 63 is formed with a spherical recess 91 for receiving this projection. Further, conveniently the projection 87 of the fitting is operatively permanently secured to the jaw member 63 in swiveling relation thereto by a headed screw 93 loosely extending through the projection 87 and boss 89 and tapped into the member 63.

As in the other modifications of the invention described, it will be observed that when the bolt 73 is tightened to clamp the jaw members 63 and 69 to the cable A the portion of the tap connector fitting between the ends of the jaw members opposite that cable is clamped between them due to the projection 87 and boss 89 through which the screw extends being reciprocal relative to the screw. The tap connector fitting also, it will be observed, because the boss fits the recess 91 in the jaw member 69, is securely held to said jaw member even though the screw 93 should be loosened. Clamping of the projection 87 between the ends of the jaw members may loosen the screw 93, but that will not affect the electrical contact between this projection and the jaw members. The construction further provides that the screw 93 will not drop out of the assembled device if it does become loosened. Otherwise the operation of the device is as described in connection with the modification of the invention shown by Figs. 1 to 4.

It will be understood that within the scope of the appended claims wide deviations may be made from the forms of the invention described without departing from the spirit of the invention.

I claim:

1. A conductor tapping device having, in combination, a first jaw member, a second jaw member, said first jaw member being formed to provide a transverse cable receiving recess having at one side thereof an upstanding part against which one side of the cable is adapted to rest, said second jaw member having a cable engaging portion adapted to engage the cable surface opposite said recess at one side of said upstanding part, means interconnecting said jaw members for drawing them together for clamping the cable between them, which means comprises a screw-threaded part movably connected to at least one of said jaw members for permitting said second jaw member to move longitudinally of said first jaw member, and means providing a fulcrum for said second jaw member forcing it to move longitudinally of said first jaw member when swung toward it for gripping the cable to move said cable engaging portion of said second jaw member toward said upstanding part.

2. A conductor tapping device having, in combination, a first jaw member, a second jaw member, said first jaw member being formed to provide a transverse cable receiving recess having at one side thereof an upstanding part against which one side of the cable is adapted to rest, said second jaw member having a cable engaging portion adapted to engage the cable surface opposite said recess at one side of said upstanding part, means interconnecting said jaw members for drawing them together for clamping the cable between them, which means comprises a screw-threaded part movably connected to at least one of said jaw members for permitting said second jaw member to move longitudinally of said first jaw member, and means operatively carried by said first jaw member having a surface portion upon which said second jaw member is slidably mounted, said surface portion and the portion of said second jaw member contacting therewith being so shaped that when said second jaw member is drawn toward said first jaw member the former will be moved longitudinally of the latter for moving said cable engaging portion of said second jaw member toward the cable and said upstanding part of said first jaw member.

3. A conductor tapping device having, in combination, a first jaw member, a second jaw member, said first jaw member being formed to provide a transverse cable receiving recess having at one side thereof an upstanding part against which one side of the cable is adapted to rest, said second jaw member having a cable engaging portion adapted to engage the cable surface opposite said recess at one side of said upstanding part, means for drawing said jaw members together for clamping the cable between them, and a projecting part operatively carried by said first jaw member shaped to form a spherical boss-like surface normally in geometrically fixed relation to said first jaw member during the drawing of said jaw members together, said second jaw member having a recess receiving said surface and cooperating therewith to cause said surface to form a fulcrum for said second jaw member operative to cause the latter to move longitudinally of said first jaw member when drawn toward it for moving said cable engaging portion of said second jaw member toward the cable and said upstanding part of said first jaw member.

4. A conductor tapping device having, in combination, a pair of members having cooperating portions for transversely gripping cables of circular cross-section and different diameters, said members also having cooperating portions for gripping a tap-connector-fitting, which fitting is rotatably carried by one of said members in substantially immovable relation longitudinally of said member, and parts associated with said fitting and the other only of said members formed to provide a cooperating spherical boss and recess for permitting swiveling said fitting relative to said member and for forming a fulcrum for said member operative to cause that member to move transversely of the conductor and longitudinally of the other member during the conductor gripping operation.

5. A conductor tapping device having, in combination, a pair of members having cooperating portions for transversely gripping conductors of circular cross-section and different diameters between them, said members also having cooperating portions for gripping a tap-connector-fitting between them, said fitting having on one side thereof a spherical boss, one of said members being formed with a spherical recess for receiving said boss, and means operative permanently to secure said fitting to the other of said members in swiveling relation thereto operative to prevent substantial longitudinal movement of said member relative to said fitting.

6. A conductor tapping device having, in combination, a pair of members having cooperating portions for transversely gripping conductors of circular cross-section and different diameters between them, said members also having cooperating portions for gripping a tap-connector-fitting between them, said fitting having on one side only thereof a spherical boss, one of said members being formed with a spherical recess for receiving said boss, a clamping screw situated between said portions of said members operative to draw one toward the other, and means operative permanently to secure said fitting to one of said members in swiveling relation thereto operative to prevent substantial longitudinal movement of said member relative to said fitting.

7. A conductor tapping device having, in combination, a pair of relatively movable jaws for transversely gripping a conductor, a tap-connector-fitting having a portion formed with a substantially flat side and an opposite side having a boss, one of said jaws having a portion formed with a flat side contacting with said flat side of said portion of said fitting, means securing said portion of said last mentioned jaw and said portion of said fitting in swiveling relation, the other of said jaws having a portion formed with a recess which receives said boss, said boss and recess having contacting surfaces which conform to the surface of a sphere, and means for drawing said jaws toward each other for gripping the conductor.

8. A conductor tapping device having, in combination, a pair of relatively movable jaws, one of said jaws being formed to hook over a horizontal conductor, a tap-connector-fitting having a portion formed with a substantially flat side and an opposite side having a boss, said jaw which is formed to hook over said conductor having a portion formed with a flat side contacting with said flat side of said portion of said fitting, means securing said portion of said last mentioned jaw and said portion of said fitting in swiveling relation, the other of said jaws having a portion formed with a recess which receives said boss, said boss and recess having contacting surfaces which conform to the surface of a sphere, and means for drawing said jaws toward each other for gripping the conductor.

9. A conductor tapping device having, in combination, a pair of cooperating members for transversely gripping the conductor, a tap-connector-fitting, said fitting and one of said members formed with cooperating flat surfaces in electrical contact in a plane extending longitudinally of the conductor whereby one may be swiveled relative to the other in said plane, the other of said members being so mounted on said fitting that it may swivel with and fulcrum relative to the first mentioned member, and means for drawing the member mounted on said fitting toward the other member about such fulcrum for gripping the conductor and said fitting between them.

10. A conductor tapping device having, in combination, a pair of cooperating members for transversely gripping the conductor, a tap-connector-fitting, means securing said fitting and one of said members in electrically contacting relation and in swiveling relation about a single axis transverse to the conductor, means for rotatably mounting the other of said members on said fitting so that said fitting may swivel relative to the first mentioned member, said last mentioned means providing a fulcrum for said member which is mounted on said fitting so that said member may move toward the member to which said fitting is secured and means for drawing the member mounted on said fitting toward the other member about such fulcrum for gripping the conductor and said fitting between them.

11. A conductor tapping device having, in combination, a pair of cooperating relatively movable members for transversely gripping a cable, means for drawing said members toward each other, means for connecting a tap to said members comprising a part swiveled to one of them for rotation about an axis transverse to the cable, said part being movable in the direction of said axis relative to the one of said members to which it is swiveled and having an end portion upon which the other of said members is fulcrumed.

12. A conductor tapping device having, in combination, a pair of cooperating relatively movable members for transversely gripping a cable, means for drawing said members toward each other, means for connecting a tap to said members comprising a tap-connector-fitting between portions of said members, and a pivot part connecting said fitting to one of said members against which latter said fitting bears, said pivot part being movable axially thereof relative to the one of said members to which said fitting is connected and having a head portion extending beyond said fitting toward the other of said members, on which head the latter is fulcrumed.

13. A conductor tapping device having, in combination, a pair of cooperating relatively movable members for transversely gripping a cable, means for drawing said members toward each other, means for connecting a tap to said members comprising a tap-connector-fitting between portions of said members, and a pivot part connecting said fitting to one of said members against which latter said fitting bears, said pivot part being movable axially thereof relative to the one of said members to which said fitting is connected and having a head portion provided with a spherical boss-like surface extending beyond said fitting toward the other of said members, the latter having a recess for receiving said boss-like surface to provide a fulcrum for that member.

14. A conductor tapping device having, in combination, a pair of cooperating relatively movable members for transversely gripping a cable, means for drawing said members toward each other, one of said members having an opening reciprocally receiving a conductor securing part, the latter being formed to provide an opening for receiving a conductor positioned between said members and having a portion projecting toward the other of said members, on which portion the last mentioned member is fulcrumed for movement toward the other member.

15. A conductor tapping device having, in combination, a pair of cooperating relatively movable members for transversely gripping a cable, means for drawing said members toward each other, one of said members having an opening reciprocally and rotatably receiving a conductor securing part, the latter being formed to provide an opening for receiving a conductor positioned between said members and having a portion projecting toward the other of said members, said portion rotatably engaging the last mentioned member and on which the latter is fulcrumed for movement toward the other member.

16. A conductor tapping device having, in combination, a first jaw member, a second jaw member, said first jaw member being formed to provide a transverse cable receiving recess having at one side thereof an upstanding part against which one side of the cable is adapted to rest, said second jaw member having a cable engaging portion adapted to engage the cable surface opposite said recess at one side of said upstanding part, means for drawing said jaw members together for clamping the cable between them, means fixedly carried by said first jaw member providing a fulcrum for said second jaw member for causing it to move longitudinally of said first jaw member when swung toward it for gripping the cable to move said cable engaging portion of said second jaw member toward said upstanding part, and a cable lug carried by one of said jaw members independently of said means.

ALFRED J. HIXON.